(12) United States Patent
Imada et al.

(10) Patent No.: US 6,671,432 B2
(45) Date of Patent: Dec. 30, 2003

(54) PLASTIC OPTICAL FIBER WITH A LENS PORTION, OPTICAL FIBER CONNECTOR, AND CONNECTING STRUCTURES AND METHODS BETWEEN OPTICAL FIBERS AND BETWEEN OPTICAL FIBER AND LIGHT EMITTING/RECEIVING DEVICE

(75) Inventors: Aya Imada, Kanagawa (JP); Hajima Sakata, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/820,621

(22) Filed: Mar. 30, 2001

(65) Prior Publication Data

US 2001/0038737 A1 Nov. 8, 2001

(30) Foreign Application Priority Data

| Apr. 5, 2000 | (JP) | 2000-102898 |
| Nov. 6, 2000 | (JP) | 2000-337172 |

(51) Int. Cl.$^7$ ................................................ G02B 6/32
(52) U.S. Cl. ......................................................... 385/33
(58) Field of Search ............................. 385/33, 32, 34, 385/35–38, 79

(56) References Cited

U.S. PATENT DOCUMENTS

| 4,632,505 | A | * | 12/1986 | Allsworth | 385/61 |
| 5,266,373 | A | * | 11/1993 | Hare et al. | 428/41.5 |
| 5,349,598 | A | | 9/1994 | Ouchi et al. | 372/50 |
| 5,841,921 | A | * | 11/1998 | Wallace | 362/554 |
| 6,123,463 | A | * | 9/2000 | Kashihara et al. | 385/59 |
| 6,154,302 | A | | 11/2000 | Yagi et al. | 385/22 |

FOREIGN PATENT DOCUMENTS

| EP | 0 862 070 | | 9/1998 | |
| JP | 60-61707 | | 4/1985 | |
| JP | 61-059303 | * | 3/1986 | G02B/6/10 |
| JP | 62-57001 | | 3/1987 | |
| JP | 05-34545 | | 2/1993 | |
| JP | 05-107427 | | 4/1993 | |
| JP | 08-75935 | | 3/1996 | |
| JP | 10-239538 | | 9/1998 | |
| JP | 11-242129 | | 9/1999 | |
| JP | 11-326689 | | 11/1999 | |

* cited by examiner

*Primary Examiner*—Tulsidas Patel
(74) *Attorney, Agent, or Firm*—Fitzpatrick, Cella, Harper & Scinto

(57) ABSTRACT

A plastic optical fiber with a lens portion includes a plastic optical fiber with a concave portion formed on its end face, and a lens portion having a function of controlling light rays. The lens portion is formed of a refractive index adjusting material filled in the concave portion and having a refractive index different from a refractive index of the plastic optical fiber.

18 Claims, 12 Drawing Sheets

PLASTIC OPTICAL FIBER WITH A LENS PORTION, OPTICAL FIBER CONNECTOR, AND CONNECTING STRUCTURES AND METHODS BETWEEN OPTICAL FIBERS AND BETWEEN OPTICAL FIBER AND LIGHT EMITTING/RECEIVING DEVICE

BACKGROUND OF THE INVENTION

1. Field of the Invention

The present invention relates to a plastic optical fiber with a lens portion having a function of controlling light rays, such as a light-condensing function, in which a concave recess such as a spherical recess is formed on an end face of the plastic optical fiber, and a refractive index adjusting material or filler (including air or the like) with a refractive index different from (typically larger than) that of the plastic optical fiber being filled in the concave recess. The present invention also relates to an optical fiber connector using the plastic optical fiber, a connecting structure or method using the plastic optical fiber, a light-emitting/receiving apparatus (this term means a light-emitting or light-receiving apparatus in this specification) in which a light-emitting/receiving device (this term means a light-emitting or light-receiving device in this specification) is combined with the plastic optical fiber with a lens portion, and the like.

2. Related Background Art

In recent years, in order to enhance the coupling efficiency between plastic optical fibers, or a plastic optical fiber and a light-emitting device/receiving device, there have been proposed some methods of forming a convex lens at the end face of the plastic optical fiber. For example, Japanese Patent Application Laid-Open No. 10(1998)-239538 discloses a method of forming a spherical contour on the end face of a plastic optical fiber by using a solvent, Japanese Patent Application Laid-Open No. 11(1999)326689 discloses a method of forming a spherical contour on the end face of a plastic optical fiber by immersing the end thereof in an organic solvent containing an optical fiber material and drying the end face after the optical fiber is lifted from the solvent, Japanese Patent Application Laid-Open No. 5(1993)-107427 discloses a method of forming a spherical contour on the end face of an optical fiber by immersing the end thereof in a photosensitive resin and hardening the end face after the optical fiber is lifted from the resin, Japanese Patent Application Laid-Open No. 8(1996)-75935 discloses a method of forming a lens shape on the end face of an optical fiber by pressing the end face thereof against a heated lens-forming mold, and Japanese Patent Publication No. 62(1988)-57001 discloses a method of forming a spherical surface on the end face of an optical fiber by heating and softening the end thereof, using its surface tension.

Further, there have been proposed, for fabricating a concave contour on the end face of a plastic optical fiber with a refractive index distribution, a method of molding the end face of an optical fiber by a heated metal mold, and a method of solving the end face of an optical fiber by a solvent (see Japanese Patent Application Laid-Open No. 11(1999)-242129).

However, end faces of those optical fibers all have convex contours, and hence, alignment between such an optical fiber and a light-emitting/receiving device is hard to achieve, compared to the case of an optical fiber with a flat end face. Further, when the end face of the optical fiber is caused to abut on an optical device, a high pressure is likely to be applied to a portion of the device, and therefore, there is a considerable possibility of damaging the device.

Moreover, the transmission efficiency in long-distance optical transmissions using optical fibers is greatly influenced by coupling losses at connecting portions between optical fibers and between an optical fiber and a light-emitting/receiving device. The coupling loss is due to deviation of the optical axis, light scattering on the end face of the optical fiber, and the like. A variety of connecting methods using light-condensing lenses have been conventionally proposed to reduce such coupling loss.

On the other hand, a large-diameter plastic optical fiber that can be readily fabricated at a relatively low cost has been recently developed, and is used in medium and short distance networks. Where those local networks are connected to a trunk-line network, there is a need of performing connection between transmission light from devices with different core diameters or numerical apertures, such as between large-diameter optical fiber and crystal or silica-contained optical fiber. The numerical aperture is determined by refractive indices of the medium around the optical fiber, its core and its cladding, while the core diameter is a physical size of the core of the optical fiber. Therefore, those terms have different categories. Problem occurs in the connection between optical fibers of which at least one of the numerical aperture and the core diameter is different.

As a method of obtaining a high coupling efficiency in such a connecting portion, there have been conventionally proposed structures as illustrated in FIGS. 1 and 2. In FIG. 1, there is illustrated a numerical-aperture converting structure using a light-condensing lens 403 such as a ball lens and a rod lens (see Japanese Patent Application Laid-Open Nos. 60(1985)-61707 and 5(1993)-34545). In FIG. 2, there is shown a numerical-aperture converting structure using a lensed optical fiber 414 whose end face is shaped into a spherical convex contour. Representative optical rays are indicated in FIGS. 1 and 2. Conversely, there has also been proposed a method in which a concave lens or the like is attached to the end face of an optical fiber with a smaller numerical aperture.

In the structure of FIG. 1 having three elements or more, however, there is the problem of deviation and inclination between optical axes of optical fibers 402 and lens 403. Particularly, alignment of a distance between end faces of the optical fibers 402, and fixation of the lens 403 are difficult, and resistance of fixture thereof to external shocks is small. In FIG. 2, the possibility of deviation in the optical system is lowered since a light-condensing lens is integrated with the lensed optical fiber 414 and the number of optical devices (402 and 414) is hence reduced to two. However, it is difficult to cause the end face of the optical fiber 414 to abut on a spacer and fix the optical fiber 414 since its end face is spherical.

SUMMARY OF THE INVENTION

It is an object of the present invention to provide a plastic optical fiber with a lens portion having a function of controlling light rays, such as a light-condensing function, in which a concave recess such as a spherical recess is formed on an end face of the plastic optical fiber, and a refractive index adjusting material or filler with a refractive index different from (and typically larger than) that of the plastic optical fiber is filled in the concave recess, an optical fiber connector using the plastic optical fiber, a connecting structure or method using the plastic optical fiber, a light-emitting/receiving apparatus in which a light-emitting/receiving device is combined with the plastic optical fiber with a lens portion, and the like.

In this specification, the plastic optical fiber means an optical fiber whose core and cladding are made of a polymer, or an optical fiber whose core is made of a polymer. In such a plastic optical fiber, the cladding may be covered with a protective layer, or a polymer jacket. Further, the plastic optical fiber may be a step-index (SI) type wherein a refractive index along its radial direction is uniform throughout but exhibits an abrupt step at its core-cladding interface, a graded-index (GI) type wherein a refractive index varies in some continuous fashion as a function of radial distance, or the like.

According to one aspect of the present invention, there is provided a plastic optical fiber with a lens portion which includes a plastic optical fiber with a concave portion formed on its end face, and a lens portion having a function of controlling light rays. The lens portion is formed of a refractive index adjusting material filled in the concave portion and having a refractive index different from a refractive index of the plastic optical fiber.

On the basis of the above structure, the following more specific structures are possible.

The concave portion can have a configuration of a rotation-symmetrical shape, such as a spherical shape, about an optical axis of the plastic optical fiber. The concave portion may also have an aspherical shape, when necessary.

The refractive index adjusting material typically has a refractive index larger than the refractive index of the plastic optical fiber to form the lens portion as a light-condensing lens portion.

The refractive index adjusting material is curable or non-curable, and an outer surface of the refractive index adjusting material filled in the concave portion can be substantially flat or spherical. The light controlling function can be obtained not only at the adjusting material-fiber interface but at the adjusting material-air interface. Therefore, large light-condensing power or the like can be achieved even by a plastic optical fiber with a flat end face or an end face of a large radius of curvature, and hence, connection and alignment between the plastic optical fiber and a light-emitting/receiving device or another optical fiber can be performed more readily than a plastic optical fiber with a considerably-convex end face.

A flat portion can be formed around the concave portion on the end face of the plastic optical fiber.

According to another aspect of the present invention, there is provided a plastic optical fiber with a lens portion which includes a plastic optical fiber, a concave portion formed on an end face of the plastic optical fiber and having a function of controlling light rays, and a flat portion formed around the concave portion on the end face of the plastic optical fiber. When this plastic optical fiber is used, a filler, such as non-curable refractive index material, air, or nitrogen gas, is filled in the concave portion and its surroundings.

According to yet another aspect of the present invention, there is provided a plastic optical fiber with a lens portion which includes a plastic optical fiber with a concave portion formed on its end face, and a lens portion having a function of controlling light rays. The lens portion is formed of a refractive index adjusting material filled in the concave portion and having a refractive index larger than a refractive index of the plastic optical fiber. Generally the refractive index of the plastic optical fiber is small (about 1.3), so its light-condensing efficiency is not sufficient when it is optically connected to another device. A sufficient light-condensing efficiency can be obtained by the lens portion of a large refractive-index adjusting material filled in the concave portion.

According to yet another aspect of the present invention, there is provided a plastic optical fiber with a lens portion which includes a plastic optical fiber with a concave portion formed on its end face, and an optical fiber which is different from the plastic optical fiber in at least one of a numerical aperture and a core diameter. The plastic optical fiber and the optical fiber are arranged with their end faces opposed to each other, a spacing interposed between their end faces, and optically coupled to each other.

Typically, the plastic optical fiber is larger than the optical fiber in at least one of the numerical aperture and the core diameter.

The concave portion of the plastic optical fiber can be filled with a curable or non-curable filler having a refractive index larger than a refractive index of the optical fiber.

The concave portion of the plastic optical fiber and its surroundings can also be filled with a curable or non-curable filler having a refractive index larger than a refractive index of the optical fiber.

When the concave portion and its surroundings are filled with air or gas whose refractive index is smaller than a refractive index of the core of the plastic optical fiber, the plastic optical fiber and the optical fiber are optically coupled in a direction from the optical fiber to the plastic optical fiber.

When a flat portion is formed around the concave portion, the flat portion can be caused to abut on a spacer such that the plastic optical fiber is aligned in an optical-axial direction.

According to yet another aspect of the present invention, there is provided an optical fiber connector which includes a plastic optical fiber with a concave portion formed on its end face, an optical fiber that is different from the plastic optical fiber in at least one of a numerical aperture and a core diameter, a first ferrule for holding the plastic optical fiber, a second ferrule for holding the optical fiber, and a housing member for housing the first ferrule and the second ferrule to arrange the plastic optical fiber and the optical fiber with their inner end faces opposed to each other and a spacing formed between their inner end faces, and to couple optically the plastic optical fiber and the optical fiber.

The housing member can be a pair of semi-cylindrical split sleeves, or an integral cylindrical member.

Outer end faces of the plastic optical fiber and the optical fiber can be formed to lie in the housing member, or on a plane which is the same as an end face of the housing member. Further, the outer end faces of the plastic optical fiber and the optical fiber can be formed non-parallel or parallel with the end face of the housing member, or uneven.

The optical fiber connector can further include a connecting unit, such as a threaded cylindrical member, for optically connecting an optical device to the optical fiber.

The outer end faces of the plastic optical fiber and the optical fiber can be formed to lie outside the end face of the housing member.

A filler, such as a curable or non-curable resin, can be filled in the spacing.

Further, a spacer can be contained in the housing member and inserted between inner end faces of the plastic optical fiber and the optical fiber.

According to yet another aspect of the present invention, there is provided a connecting method of connecting optical fibers in which a plastic optical fiber with a concave portion formed on its end face, and a second optical fiber are prepared, the concave portion of the plastic optical fiber is filled with a refractive index adjusting material, such as a resin adhesive, end faces of the plastic optical fiber and the second optical fiber are opposed to each other, and the end faces of the plastic optical fiber and the second optical fiber are bonded to optically couple the plastic optical fiber and the second optical fiber to each other.

The second optical fiber can also be a plastic optical fiber with a concave portion formed on its end face, which is filled with the refractive index adjusting material. The second optical fiber can be a plastic optical fiber with a flat end face, or a silica-contained or crystal optical fiber.

According to yet another aspect of the present invention, there is provided a connecting structure between optical fibers which includes a plastic optical fiber with a concave portion formed on its end face, a second optical fiber, and a refractive index adjusting material, such as a resin adhesive, filled in the concave portion of the plastic optical fiber. End faces of the plastic optical fiber and the second optical fiber are opposed and bonded to each other to optically couple the plastic optical fiber and the second optical fiber to each other.

The refractive index adjusting material is typically hardened finally. When the refractive index adjusting material is non-curable, an adhesive needs to be applied to a periphery of the opposed optical fibers to bond these optical fibers.

According to yet another aspect of the present invention, there is provided a connecting structure of a plastic optical fiber and a light-emitting/receiving device which includes a plastic optical fiber with a lens portion having a function of controlling light rays, a light-emitting/receiving device, and a substrate with a holding structure for holding the plastic optical fiber with the lens portion formed at its end face and an arranging portion for arranging the light-emitting/receiving device thereon. The lens portion is formed of a refractive index adjusting material filled in a concave portion on an end face of the plastic optical fiber and having a refractive index different from a refractive index of the plastic optical fiber. The plastic optical fiber is held in the holding structure to align the lens portion to the light-emitting/receiving device arranged on the arranging portion and optically couple the plastic optical fiber and the light-emitting/receiving device.

The holding structure can be a recess with a diameter slightly larger than a diameter of the plastic optical fiber, the arranging portion can be a bottom face of the recess, and a distance between the plastic optical fiber and the light-emitting/receiving device can be adjusted by controlling an insertion depth of the plastic optical fiber into the recess.

The holding structure can also be a stepped recess with an upper opening portion with a diameter slightly larger than a diameter of the plastic optical fiber and a lower opening portion with a diameter smaller than the diameter of the plastic optical fiber and a predetermined depth. The arranging portion can be a bottom face of the stepped recess, and a distance between the plastic optical fiber and the light-emitting/receiving device can be adjusted by causing the end face of the plastic optical fiber to abut a stepped face formed between the upper opening portion and the lower opening portion.

The refractive index adjusting material can be non-curable, and the non-curable refractive index adjusting material can be filled in the surroundings of the light-emitting/receiving device.

According to yet another aspect of the present invention, there is provided a method of optically connecting a plastic optical fiber to a light-emitting/receiving device in which a substrate is prepared with a holding structure for holding a plastic optical fiber with a lens portion formed at its end face and an arranging portion for arranging a light-emitting/receiving device thereon, the light-emitting/receiving device is positioned on the arranging portion, and the plastic optical fiber is set in the holding structure to oppose the lens portion to the light-emitting/receiving device and optically couple the plastic optical fiber and the light-emitting/receiving device.

These and other advantages will be more readily understood in connection with the following detailed description of the more preferred embodiments in conjunction with the drawings.

DESCRIPTION OF THE PREFERRED EMBODIMENTS

First Embodiment

A first embodiment is directed to a plastic optical fiber with a lens portion. A method of fabricating the plastic optical fiber and its structure will be described by reference to FIGS. 3A, 3B, 4A and 4B.

Figure 1:
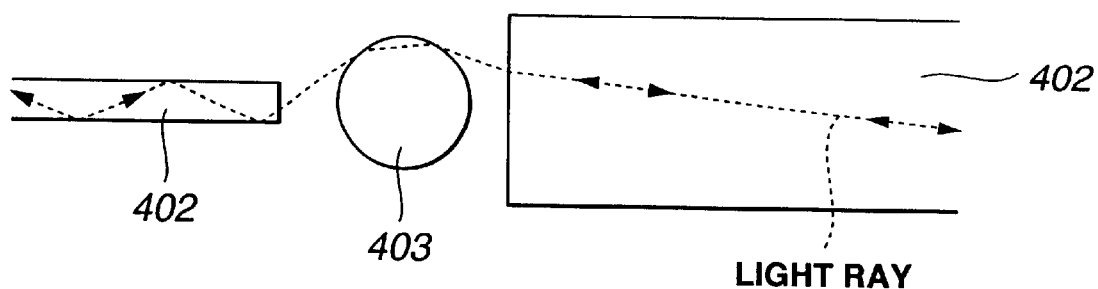
FIG. 1 is a cross-sectional view illustrating a first prior art connection between optical fibers.
Figure 2:
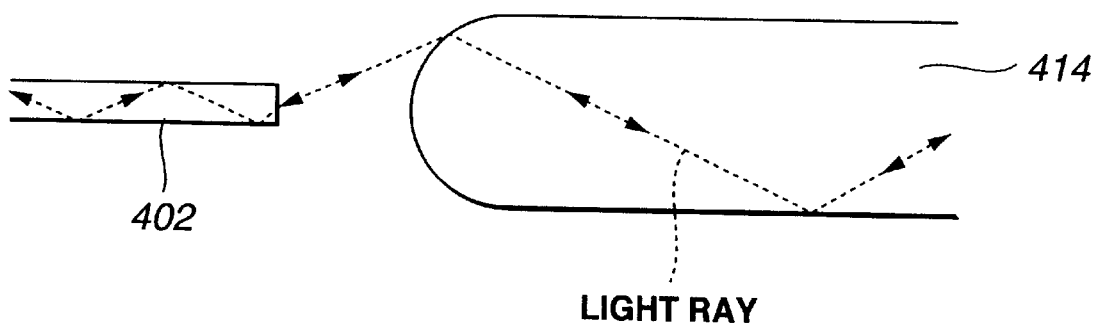
FIG. 2 is a cross-sectional view illustrating a second prior art connection between optical fibers.
Figure 3A:
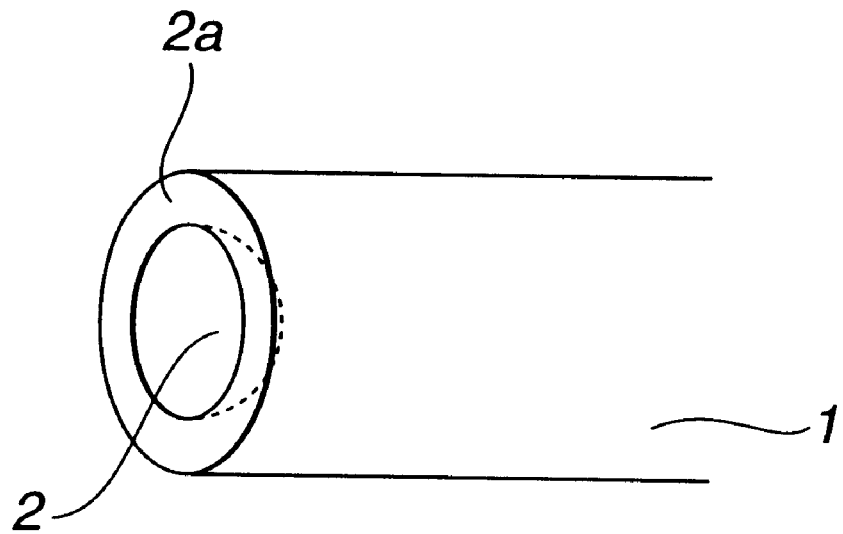
FIG. 3A is a perspective view illustrating a perspective view of an end portion of a first embodiment of a plastic optical fiber with a lens portion according to the present invention.

FIG. 3A illustrates a plastic optical fiber 1 with a spherical recess 2 formed on its end face. The recess 2 can be formed by pressing a heated smooth spherical convex mold against a flat end face of the optical fiber 1 formed by a cutter, or by dissolving the flat end face with a solvent. Typically, the spherical recess 2 has a diameter smaller than that of the optical fiber 1 but larger than a light propagating portion (in the case of a SI plastic optical fiber, a core), and a flat face 2a remains around the recess 2, as illustrated in FIGS. 3A and 3B.

Figure 4A:
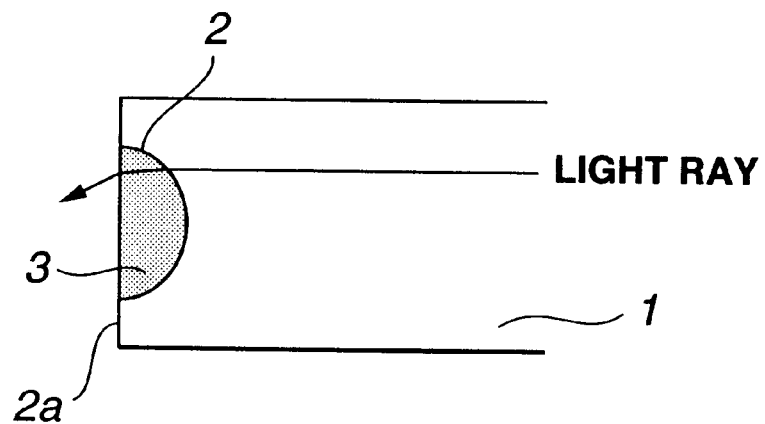
FIG. 4A is a cross-sectional view illustrating an end portion of the first embodiment.
Figure 4B:
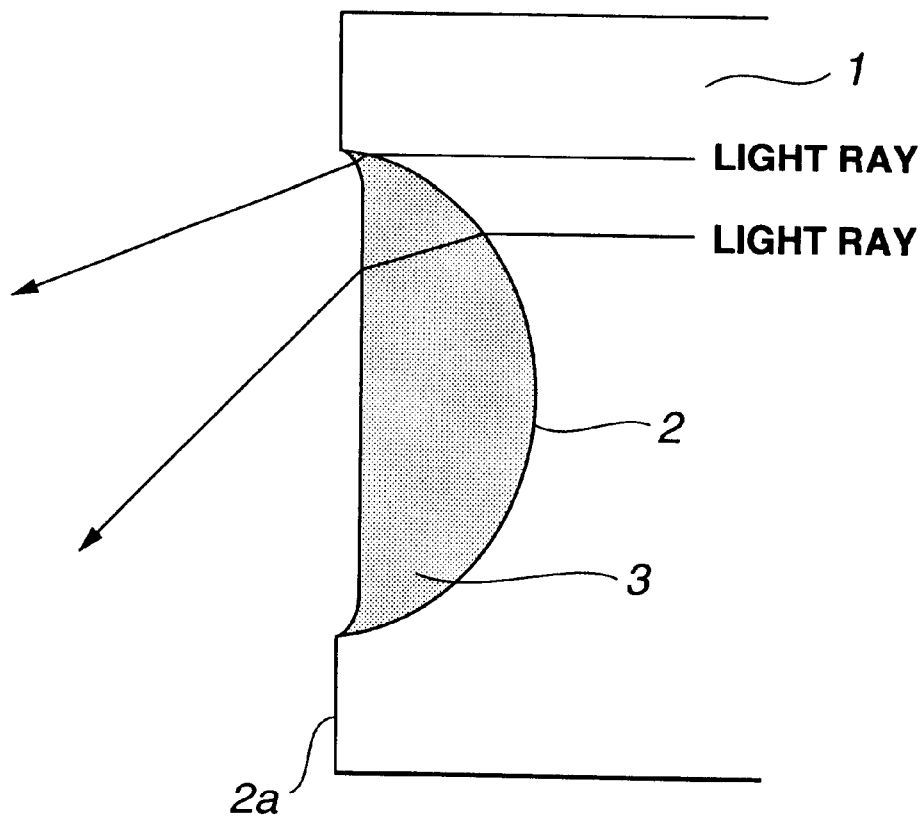
FIG. 4B is an enlarged cross-sectional view illustrating the end portion of the first embodiment.

A refractive index adjusting material 3 with a refractive index larger than that of the plastic optical fiber 1 is filled in the recess 2, and hardened. The thus-formed structure is illustrated in FIGS. 4A and 4B. FIG. 4A shows a configuration in which the adjusting material 3 is filled up to the same level as the end face of the optical fiber 1, and hardened. Actually, the surface of the adjusting material 3 slightly recedes from the end face 2a of the optical fiber 1 due to surface tension of the adjusting material 3, as illustrated in FIG. 4B. A curved face at an edge of the surface of the adjusting material 3 has an effect of impeding the light-condensing function, but this influence is negligibly small since most of the surface of the adjusting medium 3 is flat (see light rays illustrated in FIG. 4B).

The refractive index adjusting material 3 has a refractive index preferably in the range of about 1.40 to about 1.70. The refractive index of a fluorine-contained plastic optical fiber is about 1.35, and the refractive index of a polymethylmethacrylate (PMMA) optical fiber is about 1.49. A sufficient difference for achieving the light-condensing effect can be obtained between refractive indices of the optical fiber 1 and the adjusting material 3. It is preferable that the adjusting material 3 is sufficiently transparent and has non-foamy characteristics. Further, when the adjusting material 3 is thermosetting, its hardening temperature is preferably lower than a thermally-softening temperature of the plastic optical fiber 1. The hardening temperature is preferably less than 60° C. in the case of a PMMA optical fiber, and less than 100° C. in the case of a fluorine-contained plastic optical fiber.

Figure 3B:
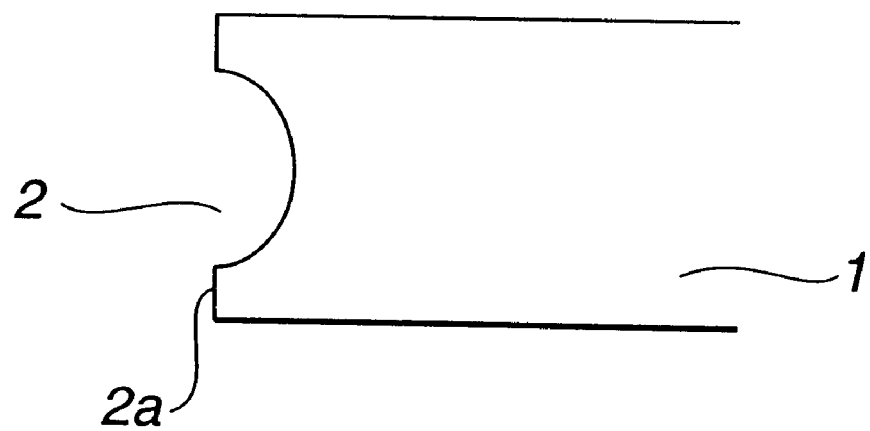
FIG. 3B is a cross-sectional view of FIG. 3A.

The plastic optical fiber 1 with the recess 2 and the flat portion 2a as illustrated in FIGS. 3A and 3B itself can also be used in a medium with a refractive index lower than that of the core of the optical fiber 1, such as air and nitrogen gas, in applicable cases.

Second Embodiment

Figure 5A:
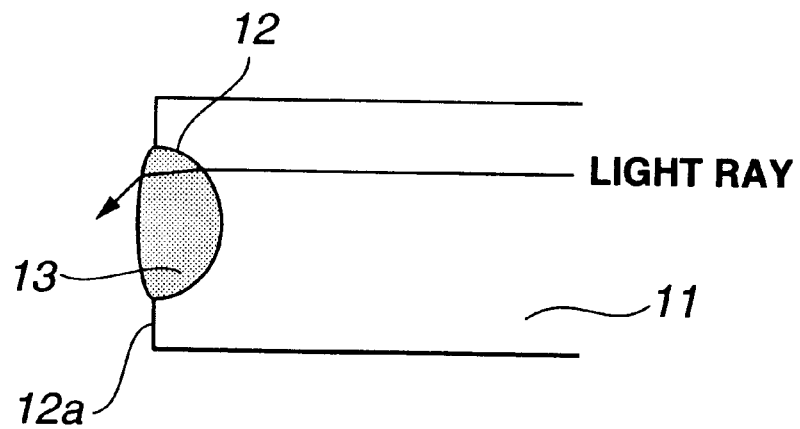
FIG. 5A is a cross-sectional view illustrating an end portion of a second embodiment of a plastic optical fiber with a lens portion according to the present invention.
Figure 5B:
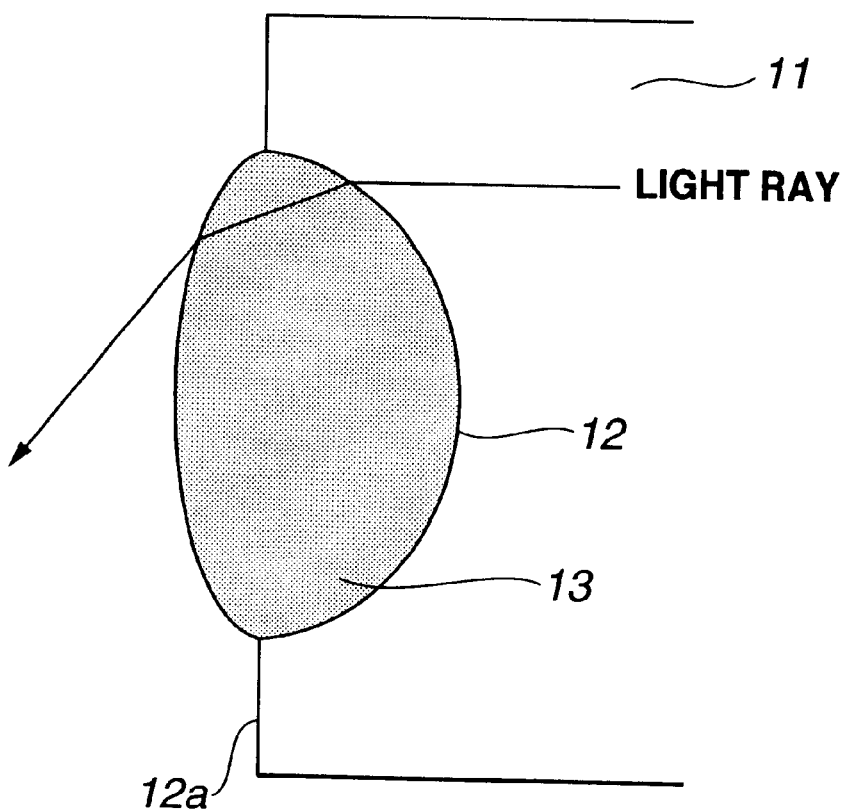
FIG. 5B is an enlarged cross-sectional view illustrating the end portion of the second embodiment.

A second embodiment is directed to a plastic optical fiber with a lens portion, in which a refractive index adjusting material 13 is filled in a concave recess 12 up to a level slightly higher than an end face 12a of a plastic optical fiber 11, and hardened as illustrated in FIGS. 5A and 5B. A convex lens is formed at the interface between air and the refractive index adjusting material 13. The convex lens is shaped due to surface tension of the adjusting material 13. A light-condensing effect can be obtained at this interface in addition to at the interface between the optical fiber 11 and the adjusting material 13. Here, the above outer convex shape varies according to the kind of selected refractive index adjusting material 13.

Third Embodiment

Figure 6A:
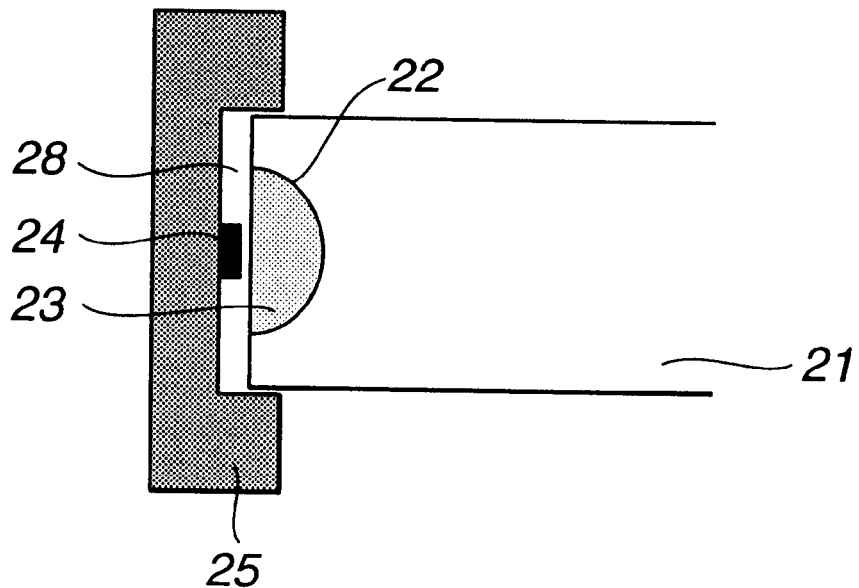
FIG. 6A is a cross-sectional view illustrating a third embodiment of a light-emitting/receiving apparatus according to the present invention, in which a plastic optical fiber with a lens portion is optically coupled to a light-emitting/receiving device.

A third embodiment is directed to a light emitting/receiving apparatus in which a light-emitting/receiving device 24 arranged on an alignment substrate 25 is optically coupled to a plastic optical fiber 21 with a lens portion of this invention, as illustrated in FIG. 6A.

In the third embodiment, the optical device 24 is arranged on the bottom surface of a hole 28 formed in the alignment substrate 25. The diameter of the hole 28 is slightly larger than the diameter of the plastic optical fiber 21. The optical fiber 21 is inserted into the hole 28. In the structure of FIG. 6A, the end face of the optical fiber 21 is appropriately set above the device 24 (for example, the end face of the optical fiber 21 abuts on the face of the device 24), and the optical fiber 21 is fixed to the substrate 25 with an adhesive (not shown).

A spherical recess 22 of the optical fiber 21 and the refractive index of a refractive index adjusting material 23 can be adjusted according to the size and location of the optical device 24.

Figure 6B:
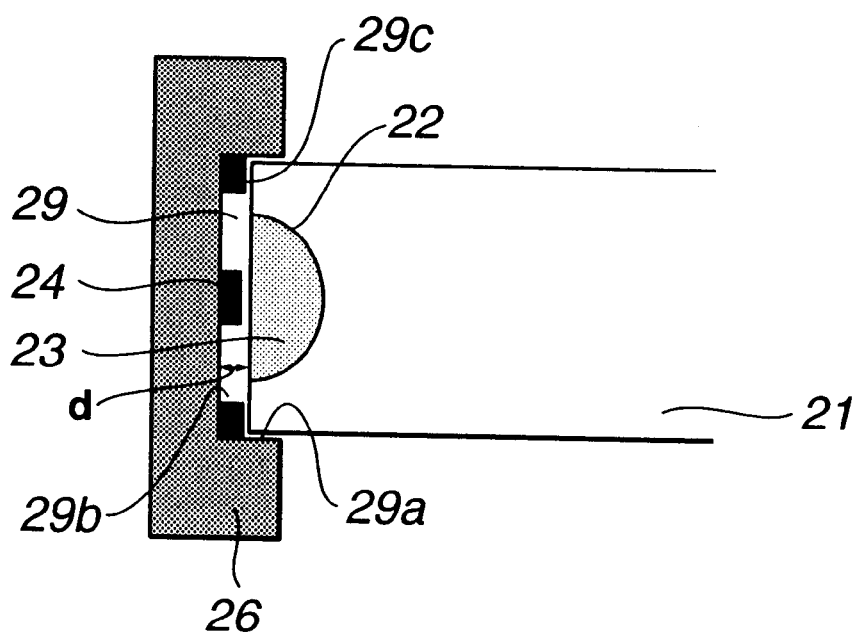
FIG. 6B is a cross-sectional view illustrating a modification of the third embodiment.

When the distance between the end face of the optical fiber 21 and the optical device 24 must be set a little longer than that of FIG. 6A, an alignment two-step hole 29 is preferably formed in a substrate 26, as illustrated in FIG. 6B. The hole 29 consists of an upper opening portion 29a with a diameter slightly larger than the diameter of the plastic optical fiber 21 and a lower opening portion 29b with a diameter smaller than the diameter of the plastic optical fiber 21 and a predetermined depth (d). The end face of the optical fiber 21 is caused to abut on a stepped face 29c formed between the upper opening portion 29a and the lower opening portion 29b. The above distance is thus controlled. In this embodiment, since the end face of the optical fiber 21 is flat or only slightly protrudes while having a sufficiently large light-condensing power, a pressure applied to the optical device 24 can be drastically reduced, compared to a conventional optical fiber with a convex lens portion.

In the third embodiment and its modification, the refractive index adjusting material 23 may be non-curable. In this case, the non-curable refractive index adjusting material 23 is dropped in the recess 22 of the plastic optical fiber 21, and the optical fiber 21 is then inserted into the hole 28 or 29. Thus a spacing around the optical device 24 is filled with the non-curable material 23 which can also act as a thermal diffusion material.

Fourth Embodiment

A fourth embodiment is directed to a connecting structure between plastic optical fibers of this invention.

Figure 7A:
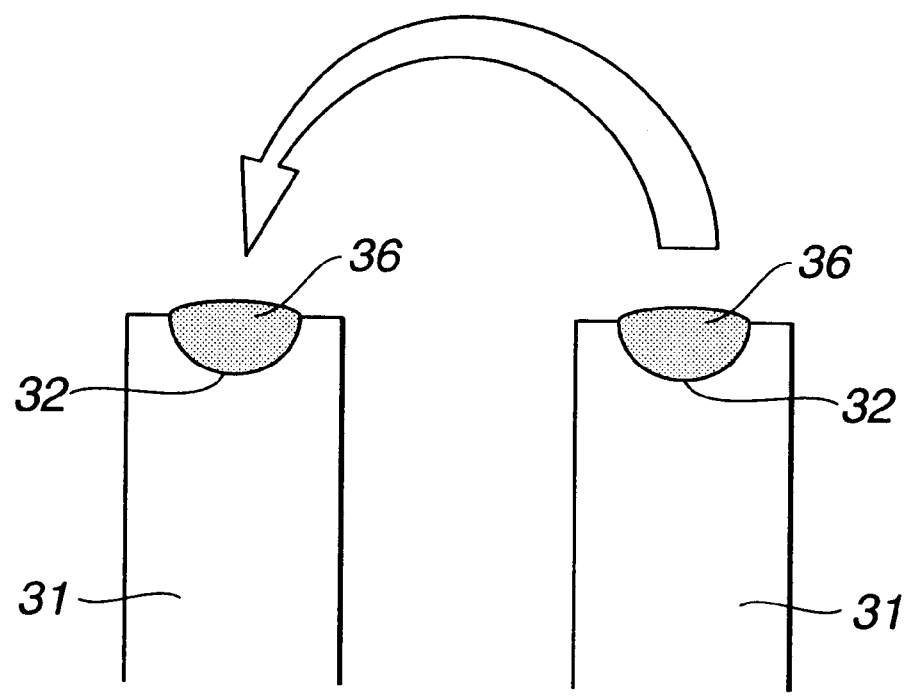
FIG. 7A is a cross-sectional view illustrating a fourth embodiment of a method of connecting two optical fibers according to the present invention.

As illustrated in FIG. 7A, a synthetic-resin adhesive 36 is affluently filled in concave recesses 32 of plastic optical fibers 31 with the recesses 32, facing upward, such that the adhesive 36 protrudes from the end face of the optical fiber 31. The resin adhesive 36 used here is preferably non-foamy.

Figure 7B:
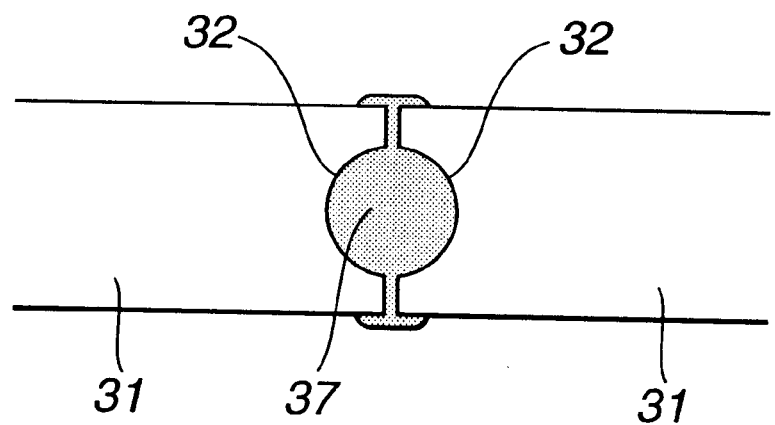
FIG. 7B is a cross-sectional view illustrating an optical fiber connecting structure fabricated by the fourth embodiment.

The end faces of the plastic optical fibers 31 are then opposed to each other under the condition that the loaded resin adhesive 36 does not flow out, and the adhesive 36 is then hardened by light or heat, as illustrated in FIG. 7B. Hardened synthetic-resin adhesive is indicated by reference numeral 37 in FIG. 7B. It is preferable to cause the optical fibers 31 to oppose to each other along a horizontal direction than along a vertical direction, because even if an air foam is generated in the adhesive 36, the foam will move to the edge of a light propagating portion of the optical fiber 31. Here, there is a possibility that the adhesive 36 extends along the end face of the optical fiber 31 and leaks out to the outer face of the optical fiber 31. This leakage is, however, not disadvantageous as far as a spacing between end faces of the optical fibers 31 is sufficiently small, because the extended adhesive 36 has an effect of enhancing the bonding intensity between the plastic optical fibers 31.

In a conventional connection between optical fibers, a precise alignment is needed since a lens is interposed between flat end faces of two optical fibers. In this embodiment, outer contours of the optical fibers 31 only need to be coincident with each other, and little positional deviation occurs at the connection portion with time since the structure is totally integrated.

Fifth Embodiment

A fifth embodiment is directed to a connecting structure between an optical fiber and a plastic optical fiber of this invention.

Figure 8:
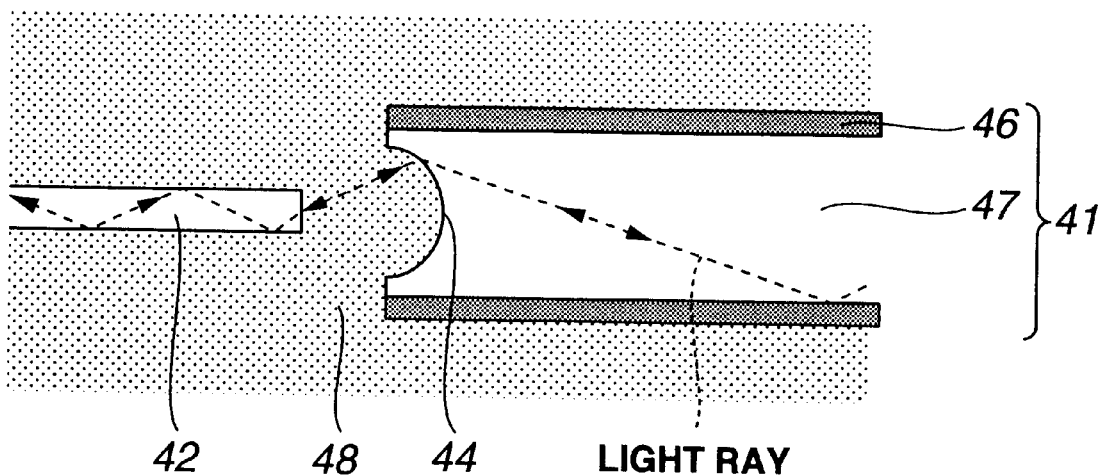
FIG. 8 is a cross-sectional view illustrating a fifth embodiment of an optical fiber connecting structure.

As illustrated in FIG. 8, a plastic optical fiber 41 with a large-diameter core 47 surrounded by a cladding 46 is optically coupled to an optical fiber 42 (a silica-contained optical fiber, an optical fiber with a polymer cladding) with a small-diameter core.

In the construction of FIG. 8, a filler 48 with a refractive index larger than that of the core 47 is filled in not only a concave recess 44 formed on the end face of the plastic optical fiber 41 but also its surroundings. The end face of the optical fiber 42 is positioned close to a focal point of a light-condensing lens consisting of the recess 44 and the filler 48 (see light ray in FIG. 8). When the connecting portion is contained in a cylindrical member such as a connector, the filler 48 may be non-curable. In the case of a curable filler, there is little fear that the optical system deviates due to the surrounding atmosphere, since the connecting portion is sealed after the filler 48 is hardened, though there is a little fear of deviation in the optical axis due to contraction of the filler 48 at the time of curing.

Sixth Embodiment

A sixth embodiment is directed to a connecting structure between an optical fiber and a plastic optical fiber with a lens portion of this invention.

Figure 9:
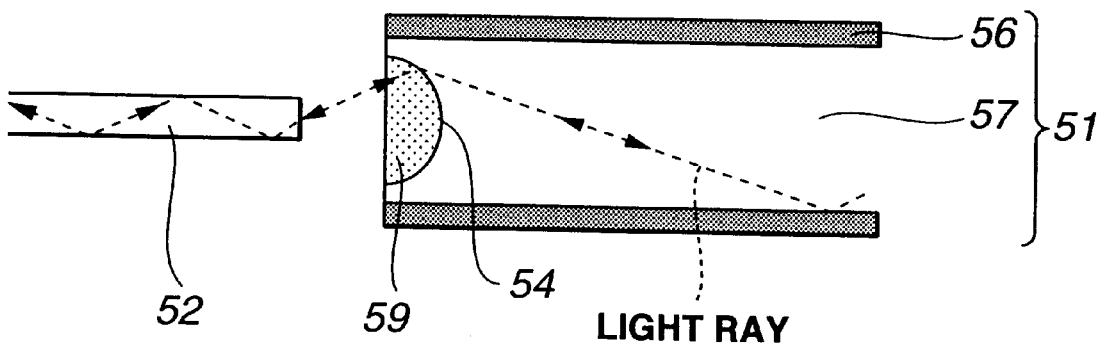
FIG. 9 is a cross-sectional view illustrating a sixth embodiment of an optical fiber connecting structure.

As illustrated in FIG. 9, a plastic optical fiber 51 with a large-diameter core 57 surrounded by a cladding 56 is optically coupled to an optical fiber 52 with a small-diameter core. In the plastic optical fiber 51, a curable filler 59 with a refractive index larger than that of the core 57 is filled in a concave recess 54 of the optical fiber 51, and hardened to construct a light-condensing lens.

Also in this embodiment, the end face of the small-diameter optical fiber 52 is positioned close to a focal point of a light-condensing lens consisting of the recess 54 and the filler 59 (see light ray in FIG. 9). The plastic optical fiber 51 and the optical fiber 52 are fixed to a relationship as illustrated in FIG. 9, by an appropriate supporter or connector.

Seventh Embodiment

A seventh embodiment is directed to a connecting structure between an optical fiber and a plastic optical fiber with a convex lens portion of this invention.

Figure 10:
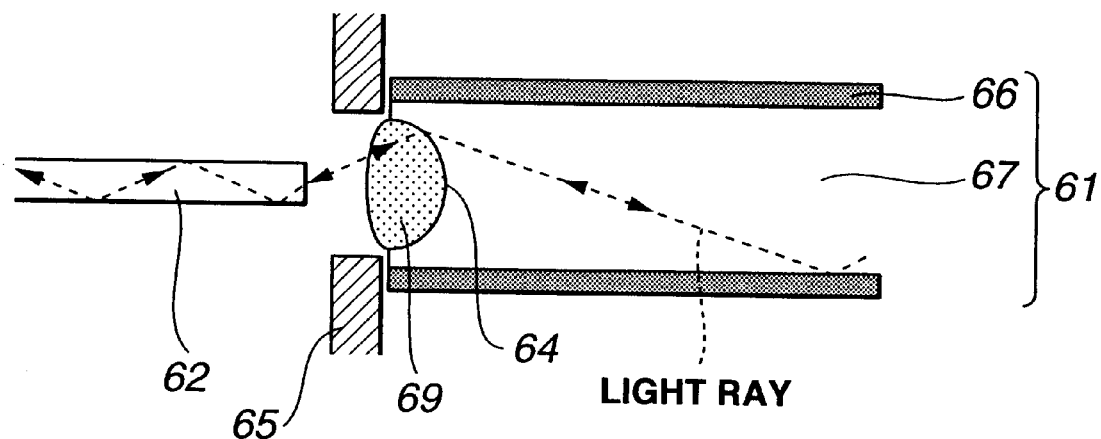
FIG. 10 is a cross-sectional view illustrating a seventh embodiment of an optical fiber connecting structure.

As illustrated in FIG. 10, a plastic optical fiber 61 with a large-diameter core 67 surrounded by a cladding 66 is optically coupled to an optical fiber 62 with a small-diameter core. In the plastic optical fiber 61, a curable filler 69 with a refractive index larger than that of the core 67 is filled in a concave recess 64 of the optical fiber 61 such that the outer surface of the filler 69 protrudes from the end face of the optical fiber 61 due to surface tension, and hardened to construct a light-condensing convex lens. When the diameter of the recess 64 is smaller than that of the plastic optical fiber 61, a flat surface is formed at the periphery of the end face of the optical fiber 61. Therefore, alignment in the optical-axial direction can be readily achieved by pressing this flat surface against a spacer 65.

Also in this embodiment, the end face of the optical fiber 62 is positioned close to a focal point of a light-condensing convex lens consisting of the recess 64 and the filler 69 (see light ray in FIG. 10).

Where numerical apertures of the two optical fibers differ so largely that a focal point of the large-diameter optical fiber cannot be formed near the end face of small-diameter optical fiber 62 only by using a normal lensed optical fiber, a light-condensing lens is further needed to be interposed between the two optical fibers. In this embodiment, however, no further lens is needed since the light-condensing convex lens consisting of the recess 64 and the filler 69 can achieve a sufficiently small focal length. Thus, the number of optical components can be reduced, and the size of the optical system can be decreased in the seventh embodiment.

Eighth Embodiment

An eighth embodiment is directed to a connecting structure between an optical fiber and a plastic optical fiber with a concave recess of this invention.

Figure 11:
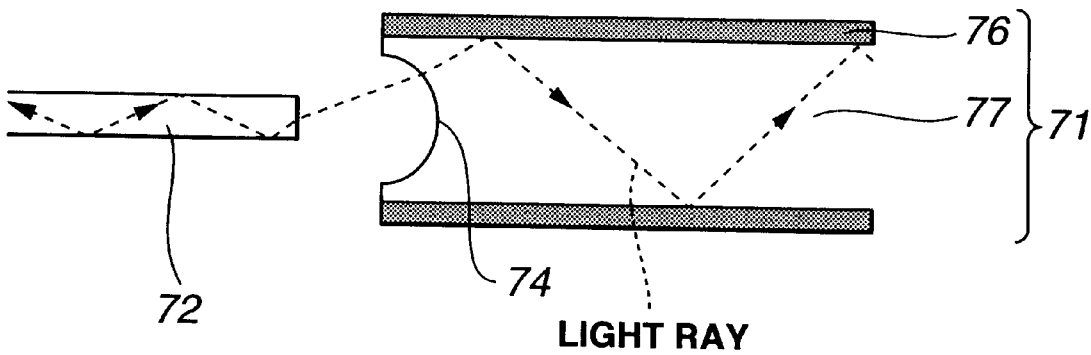
FIG. 11 is a cross-sectional view illustrating an eighth embodiment of an optical fiber connecting structure.

As illustrated in FIG. 11, no material is filled in a concave recess 74 of a plastic optical fiber 71 with a large-diameter core 77 surrounded by a cladding 76, i.e., gas, such as air or nitrogen gas, is filled in and around the recess 74. In this embodiment, the numerical aperture of the plastic optical fiber 71 is increased by the concave recess 74, and this structure thus has the same effect as the case where a concave lens is inserted before a flat face of a plastic optical fiber. Light transmitted from a small-diameter optical fiber 72 to the large-diameter optical fiber 71 can be highly effectively coupled only by putting end faces of those optical fibers 71 and 72 close to each other (see light ray in FIG. 11). Additionally, when the recess 74 is formed as illustrated in FIG. 11, light reflected by the end face of the optical fiber 71 and returned to the optical fiber 72 can be reduced. This connecting structure is, however, unsuitable for the case where light is to be transmitted from the large-diameter optical fiber 71 to the small-diameter optical fiber 72. In this embodiment, a flat surface is formed around the recess 74 on the end face of the plastic optical fiber 71.

Ninth Embodiment

A ninth embodiment is directed to an optical fiber connector for connecting two optical fibers with different numerical apertures or core diameters.

Figure 12:
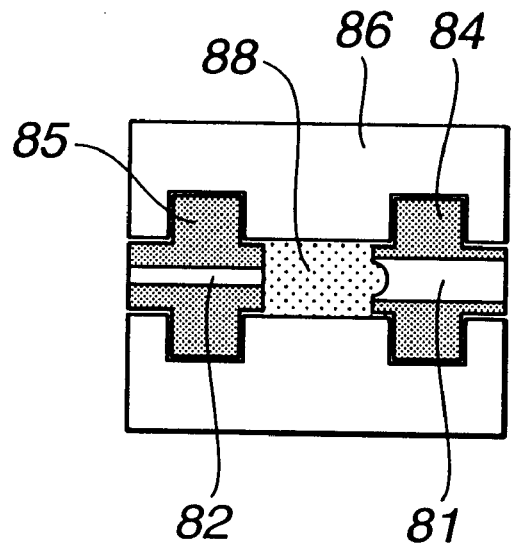
FIG. 12 is a cross-sectional view illustrating a ninth embodiment of an optical fiber connector.

As illustrated in FIG. 12, the connector of this embodiment includes a large-diameter plastic optical fiber 81 with a concave recess, a small-diameter optical fiber 82, a filler 88 filled in the recess and a spacing between the two optical fibers 81 and 82 and having a refractive index larger than that of a core of the plastic optical fiber 81, ferrules 84 and 85 for holding the optical fibers 81 and 82, respectively, and a cylindrical member 86, such as a pair of slit sleeves, for integrating the ferrules 84 and 85 therein, which has a hollow space with a shape as illustrated in FIG. 12.

The filler 88 may be either curable or non-curable. It is, however, preferable, that the filler 88 is a two-liquid mixed resin (i.e., epoxy resin) or a radiation-curable resin, but not a material that reacts on contact with air to be hardened, since the filler 88 is sealed within the cylindrical member 86 and cannot react with air. Further, the filler 88 preferably has as small a contraction coefficient as possible, and is non-foamy. Additionally, the filler 88 is preferably a resin highly transparent to wavelengths of propagating light used.

The connector of this embodiment can be fabricated in the following manner. End portions of the optical fibers 81 and 82 are inserted into the ferrules 84 and 85 and held thereby, respectively, and the ferrules 84 and 85 are put in and fixed to the split sleeves 86 as illustrated in FIG. 12. The sleeves 86 are then coupled, and thereafter the curable resin 88 is injected into a spacing between the optical fibers 81 and 82 and the recess of the plastic optical fiber 81 through a hole (not shown) formed in the sleeve 86, in such a manner that no foams are generated in the resin 88. When the resin 88 is the two-liquid mixed material, the resin 88 may be left as it is. When the resin 88 is the radiation-curable material, ultraviolet radiation or visible rays are applied to the resin 88 to harden it. Light rays may be applied through the optical fiber 81 or 82. When the split sleeves 86 are transparent, light rays may be applied through the transparent sleeves 86.

To outer side flat faces of the optical connector of FIG. 12, an optical fiber, a silica-contained waveguide, a photodiode, a semiconductor laser, or the like can be attached by using an appropriate connecting means.

Tenth Embodiment

A tenth embodiment is directed to a connecting structure between an optical fiber and a plastic optical fiber with a concave recess of this invention.

Figure 13:
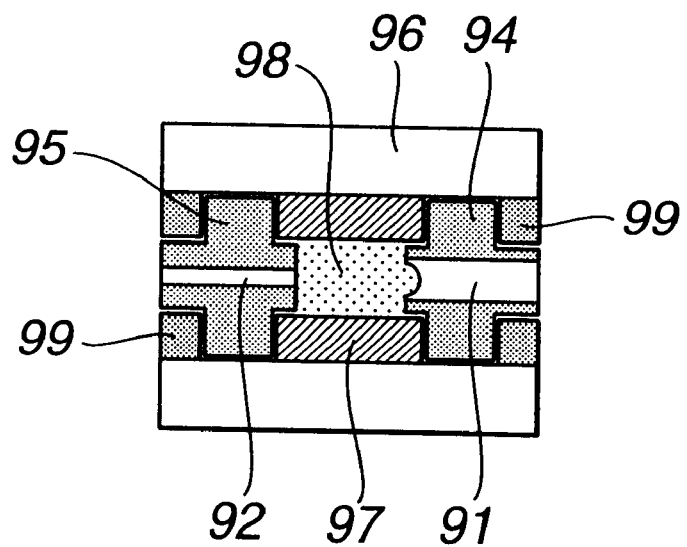
FIG. 13 is a cross-sectional view illustrating a tenth embodiment of an optical fiber connector.

As illustrated in FIG. 13, an integral cylindrical member 96 with a cylindrical hollow is used in the tenth embodiment. In this embodiment, a cylindrical spacer 97 with a cylindrical hollow space is inserted into the cylindrical member 96, a ferrule 94 to which a plastic optical fiber 91 with a concave recess is attached is inserted into the cylindrical member 96, and a filler 98 is filled in the spacer 97. Thereafter, another ferrule 95 to which an optical fiber 92 is attached is inserted into the cylindrical member 96 from the other side, and all of the components are fixed by fitting annular stuffing members 99 into annular grooves on outer faces of the ferrules 94 and 95, respectively.

To outer faces of the optical connector of FIG. 13, an optical fiber, a silica-contained waveguide, a photodiode, a semiconductor laser, or the like can be attached by using an appropriate connecting means.

Eleventh Embodiment

An eleventh embodiment is directed to a connecting structure between an optical fiber and a plastic optical fiber with a concave recess of this invention.

Figure 14A:
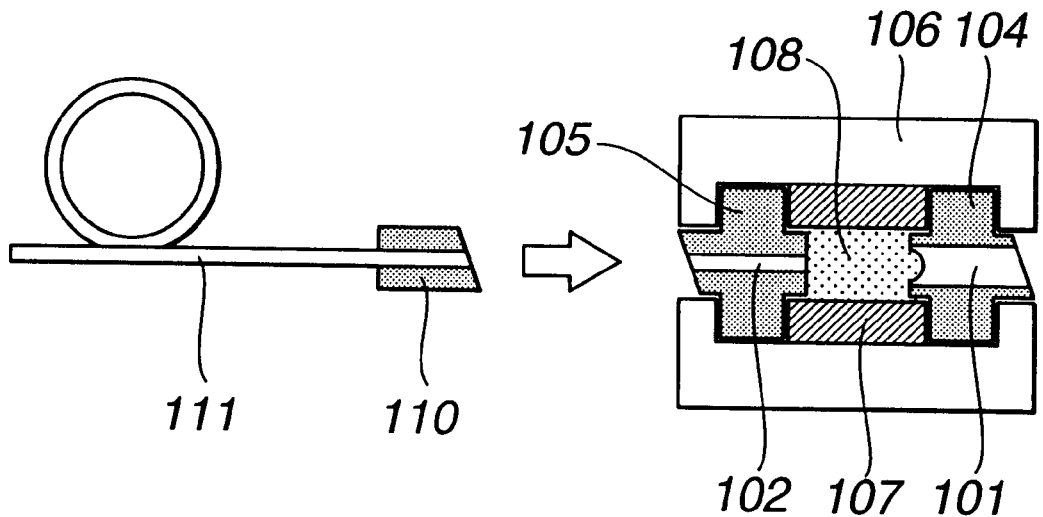
FIG. 14A is a cross-sectional view illustrating an eleventh embodiment of an optical fiber connector.
Figure 14B:
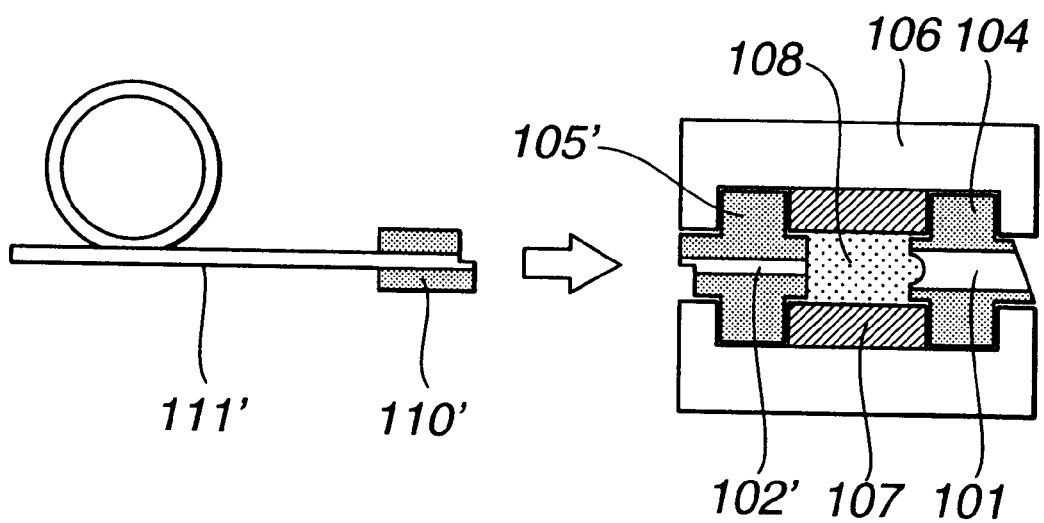
FIG. 14B is a cross-sectional view illustrating a modification of the eleventh embodiment.

In the eleventh embodiment, as illustrated in FIGS. 14A and 14B (FIG. 14B illustrates its modification), outer faces of ferrules 104 and 105 (105') and optical fibers 101 and 102 (102') contained in a cylindrical member 106, such as a pair of split sleeves, are not parallel with end faces of the cylindrical member 106, and instead are shaped into slanted faces or uneven faces. A ferrule 110 (110') with a complementary shape to this slant or uneven face is inserted into the cylindrical member 106 to couple an optical fiber 111 (111') or the like to the optical fiber 101 or 102 (102') contained in the cylindrical member 106. The end portion of the optical fiber 111 (111') is held by the ferrule 110 (110'). The cylindrical member 106 also contains a spacer 107 and a filler 108.

In this structure, the positional relationship between the optical fiber 101 or 102 (102') in the cylindrical member 106 and the external optical fiber 111 (111') or the like is structurally determined automatically when those are coupled to each other.

To the ferrule 110 (110'), a silica-contained waveguide, a photodiode, a semiconductor laser, or the like can be attached as well as the optical fiber 111 (111'). As for other points, the eleventh embodiment is the same as the ninth or tenth embodiment.

Twelfth Embodiment

A twelfth embodiment is directed to an optical fiber connector with coupling means between an optical fiber and a plastic optical fiber with a concave recess of this invention.

Figure 15:
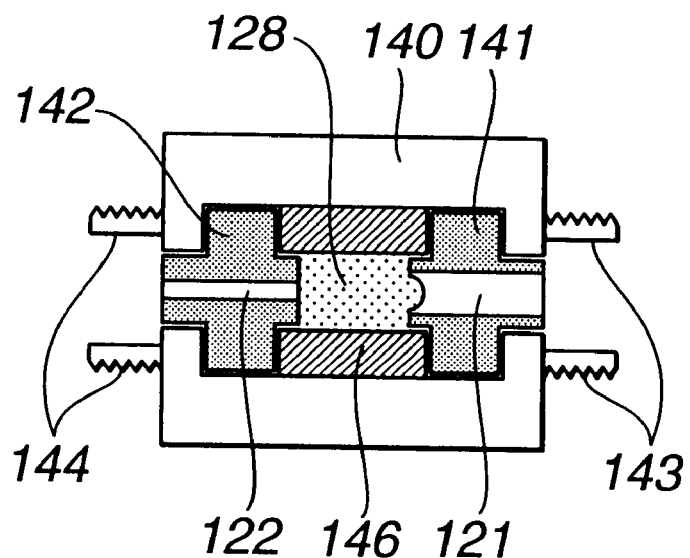
FIG. 15 is a cross-sectional view illustrating a twelfth embodiment of an optical fiber connector.

In the optical fiber connector of the twelfth embodiment, as illustrated in FIG. 15, connecting ports 143 and 144 are fixed to opposite end faces of an optical fiber connector, respectively, whose structure is substantially the same as that of the tenth embodiment. The connector of this embodiment includes a large-diameter plastic optical fiber 121 with a concave recess, a small-diameter optical fiber 122, a filler 128 filled in the recess and a spacing between the two optical fibers 121 and 122 and (the filler 128 having a refractive index larger than that of a core of the plastic optical fiber 121), ferrules 141 and 142 for holding the optical fibers 121 and 122, respectively, a cylindrical spacer 146, and a cylindrical member 140, such as a pair of slit sleeves, for integrating the ferrules 141 and 142 therein which has a hollow space with a shape as illustrated in FIG. 15.

The connecting port 143 or 144 is a receptacle of an FC type connector, a receptacle of an SC type connector, or the like. A thread is formed on the outer face of the cylindrical receptacle 143 or 144. An optical fiber, a silica-contained waveguide, a photodiode, a semiconductor laser, or the like can be attached to the connecting port 143 or 144 by threading a connector with an internal thread on its inner surface into the thread of the connecting port 143 or 144.

Thirteenth Embodiment

A thirteenth embodiment is directed to another optical fiber connector with coupling means between an optical fiber and a plastic optical fiber with a concave recess of this invention.

Figure 16:
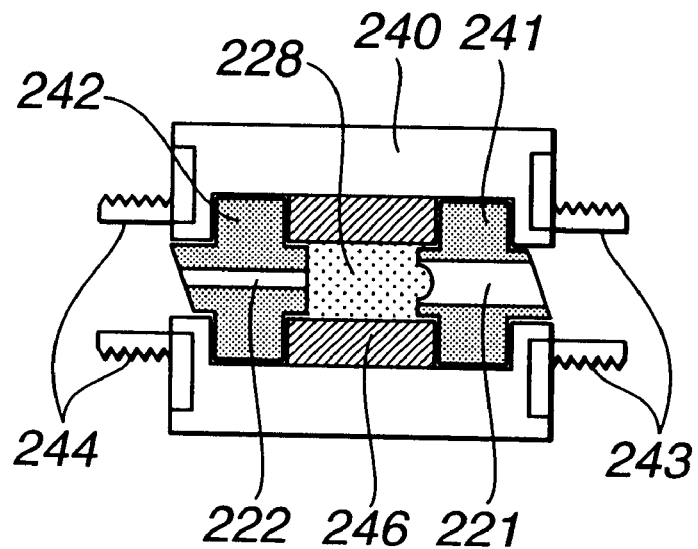
FIG. 16 is a cross-sectional view illustrating a thirteenth embodiment of an optical fiber connector.

As illustrated in FIG. 16, a connecting port 243 or 244 is fixed to each end face of an optical fiber connector whose structure is substantially the same as that of the eleventh embodiment. The connector of this embodiment includes a plastic optical fiber 221 with a concave recess, a small-diameter optical fiber 222, a filler 228 filled in the recess and a spacing between the two optical fibers 221 and 222 and (the filler 228 having a refractive index larger than that of a core of the plastic optical fiber 221), ferrules 241 and 242 for holding the optical fibers 221 and 222, respectively, a cylindrical spacer 246, a cylindrical member 240, such as a pair of split sleeves, for integrating the ferrules 241 and 242 therein which has a hollow space with a shape as illustrated in FIG. 16, and connecting ports 243 and 244 attached to opposite end faces of the cylindrical member 240, respectively.

The connecting port 243 or 244 is the same as the cylindrical receptacle 143 or 144 of the twelfth embodiment. As illustrated in FIG. 16, outer faces of ferrules 241 and 242 and optical fibers 221 and 222 inserted into the cylindrical member 240 are not parallel to end faces of the cylindrical member 240, and instead are shaped into slanted faces. A ferrule with a complementary shape to this slanted face is inserted into the cylindrical member 240, and structurally automatically positioned relative to the ferrule 241 or 242 to couple an optical fiber or the like to the optical fiber 221 or 222 contained in the cylindrical member 240, and a female thread connector is then threaded into the receptacle 243 or 244 with the male thread. In this structure, accurate and easy optical coupling can be achieved between two optical devices.

Fourteenth Embodiment

A fourteenth embodiment is directed to an optical fiber connector between an optical fiber and a plastic optical fiber with a concave recess of this invention.

Figure 17:
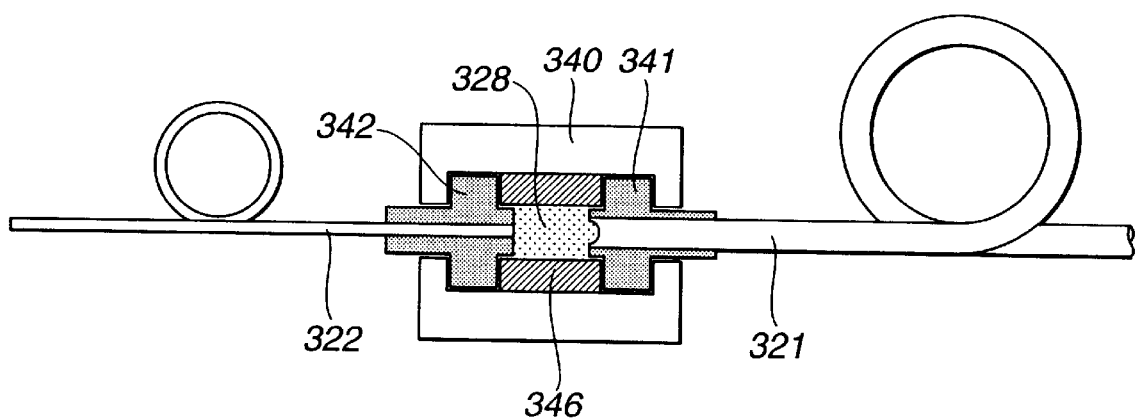
FIG. 17 is a cross-sectional view illustrating a fourteenth embodiment of an optical fiber connector.

As illustrated in FIG. 17, a connector of this embodiment includes a plastic optical fiber 321 with a concave recess on its end face, a small-diameter optical fiber 322, a filler 328 filled in the recess and a spacing between the two optical fibers 321 and 322 and (the filler 328 having a refractive index larger than that of a core of the plastic optical fiber 321), ferrules 341 and 342 for holding the optical fibers 321 and 322, respectively, a cylindrical spacer 346, and a cylindrical member 340, such as a pair of split sleeves, for integrating the ferrules 341 and 342 therein, the cylindrical member 340 having a hollow space with a shape as illustrated in FIG. 17.

In this embodiment, each ferrule 341 or 342 has a cylindrical portion extending outward from the cylindrical member 340, and the optical fibers 321 and 322 also extend outward as illustrated in FIG. 17. In an optical distributor for connecting a trunk line to a local area network in an office or home, it is possible to use the above optical fiber connector like a normal optical fiber at the connecting point between a silica-contained optical fiber and a multi-mode optical fiber. Here, optical coupling can be achieved without complicate work at the connecting point, and so the optical network system can be readily built at a relatively low cost.

While the present invention has been described with respect to what is presently considered to be the preferred embodiments, it is to be understood that the invention is not limited to the disclosed embodiments. The present invention is intended to cover various modifications and equivalent arrangements included within the spirit and scope of the appended claims.

What is claimed is:

1. A plastic optical fiber with a lens portion comprising:
   a plastic optical fiber, a concave portion being formed on an end face of said plastic optical fiber; and
   a lens portion, said lens portion comprising a packing material filled in said concave portion, said packing material having a refractive index larger than a refractive index of said plastic optical fiber,
   wherein an outer surface of said packing material is substantially flat.

2. The plastic optical fiber with a lens portion according to claim 1, wherein said concave portion has a rotation-symmetrical shape about an optical axis of said plastic optical fiber.

3. The plastic optical fiber with a lens portion according to claim 2, wherein said concave portion has a spherical shape about an optical axis of said plastic optical fiber.

4. The plastic optical fiber with a lens portion according to claim 1, wherein said lens portion is a light-condensing lens portion.

5. The plastic optical fiber with a lens portion according to claim 1, wherein an outer surface of said packing material filled in said concave portion is substantially spherical.

6. The plastic optical fiber with a lens portion according to claim 1, wherein a flat portion is formed around said concave portion on the end face of said plastic optical fiber.

7. The plastic optical fiber with a lens portion according to claim 1, wherein the width of said concave portion is less than the width of a cross section of said plastic optical fiber.

8. A plastic optical fiber with a lens portion comprising:
   a plastic optical fiber, a concave portion being formed on an end face of said plastic optical fiber; and
   a lens portion, said lens portion comprising a packing material filled in said concave portion, said packing material comprising a curable material having a refractive index larger than a refractive index of said plastic optical fiber,
   wherein an outer surface of said packing material is substantially flat.

9. A plastic optical fiber with a lens portion comprising:
   a plastic optical fiber, a concave portion being formed on an end face of said plastic optical fiber;
   a lens portion, said lens portion comprising a packing material filled in said concave portion,
   wherein said packing material has a refractive index different from a refractive index of said plastic optical fiber, and an outer surface of said packing material is substantially flat.

10. A plastic optical fiber with a lens portion comprising:
    a plastic optical fiber;
    a concave portion, said concave portion being formed on an end face of said plastic optical fiber and a packing material filled in said concave portion, said packing material having a refractive index larger than a refractive index of said plastic optical fiber; and
    a flat portion formed on the end face of said plastic optical fiber, said flat portion being formed around said concave portion on the end face of said plastic optical fiber.

11. A plastic optical fiber with a lens portion comprising:
    a plastic optical fiber, a concave portion being formed on an end face of said plastic optical fiber and a flat portion being formed on the end face of said plastic optical fiber around said concave portion; and
    a lens portion having a function of controlling light rays, said lens portion being formed of a refractive index adjusting material filled in said concave portion and having a refractive index larger than a refractive index of said plastic optical fiber.

12. The plastic optical fiber with a lens portion according to claim 11, wherein said concave portion has a rotation-symmetrical shape about an optical axis of said plastic optical fiber.

13. The plastic optical fiber with a lens portion according to claim 12, wherein said concave portion has a spherical shape about an optical axis of said plastic optical fiber.

14. The plastic optical fiber with a lens portion according to claim 11, wherein said refractive index adjusting material comprises a curable material.

15. The plastic optical fiber with a lens portion according to claim 11, wherein an outer surface of said refractive index adjusting material filled in said concave portion is substantially flat.

16. The plastic optical fiber with a lens portion according to claim 11, wherein an outer surface of said refractive index adjusting material filled in said concave portion is substantially spherical.

17. The plastic optical fiber with a lens portion according to claim 11, wherein a flat portion is formed around said concave portion on the end face of said plastic optical fiber.

18. The plastic optical fiber with a lens portion according to claim 11, wherein the width of said concave portion is less than the width of a cross section of said plastic optical fiber.

* * * * *

UNITED STATES PATENT AND TRADEMARK OFFICE
CERTIFICATE OF CORRECTION

PATENT NO. : 6,671,432 B1
DATED : December 30, 2003
INVENTOR(S) : Aya Imada et al.

It is certified that error appears in the above-identified patent and that said Letters Patent is hereby corrected as shown below:

<u>Column 13,</u>
Line 33, "complicate" should read -- complicated --.

Signed and Sealed this

Seventeenth Day of August, 2004

JON W. DUDAS
*Acting Director of the United States Patent and Trademark Office*